United States Patent
Kim et al.

(10) Patent No.: US 8,212,693 B2
(45) Date of Patent: Jul. 3, 2012

(54) BIT-STREAM PROCESSING/TRANSMITTING AND/OR RECEIVING/PROCESSING METHOD, MEDIUM, AND APPARATUS

(75) Inventors: Junghoe Kim, Yongin-si (KR); Eunmi Oh, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1665 days.

(21) Appl. No.: 11/546,435

(22) Filed: Oct. 12, 2006

(65) Prior Publication Data

US 2007/0081536 A1   Apr. 12, 2007

Related U.S. Application Data

(60) Provisional application No. 60/725,317, filed on Oct. 12, 2005, provisional application No. 60/726,159, filed on Oct. 14, 2006.

(30) Foreign Application Priority Data

| May 30, 2006 | (KR) | .................. 10-2006-0049081 |
| May 30, 2006 | (KR) | .................. 10-2006-0049082 |
| Jul. 19, 2006 | (KR) | .................. 10-2006-0067705 |
| Sep. 28, 2006 | (KR) | .................. 10-2006-0095040 |

(51) Int. Cl.
   *H03M 7/00*     (2006.01)
(52) U.S. Cl. .......... 341/50; 370/352; 370/474; 709/227; 714/701
(58) Field of Classification Search .............. 341/50–90; 370/395, 392, 474; 375/E7.013; 704/E19.044
   See application file for complete search history.

(56) References Cited

U.S. PATENT DOCUMENTS

| 6,785,261 | B1 * | 8/2004 | Schuster et al. | ............. 370/352 |
| 6,934,756 | B2 * | 8/2005 | Maes | ............. 709/227 |
| 7,301,966 | B2 * | 11/2007 | Metcalf | ............. 370/474 |
| 7,523,362 | B2 * | 4/2009 | Bader et al. | ............. 714/701 |
| 7,529,675 | B2 * | 5/2009 | Maes | ............. 704/270.1 |
| 2004/0181395 | A1 | 9/2004 | Kim et al. | |
| 2007/0223577 | A1 | 9/2007 | Ehara et al. | |

FOREIGN PATENT DOCUMENTS

| KR | 2005-51046 | 6/2005 |
| WO | 03/104935 | 12/2003 |
| WO | WO 2004-08806 | 1/2004 |
| WO | 2005/112005 | 11/2005 |

OTHER PUBLICATIONS

Juergen Herre et al., "Overview of MPEG-4 Audio and its Applications in Mobile Communications", Proceedings of ICCT2000, vol. 1, pp. 604-613.

(Continued)

*Primary Examiner* — Lam T Mai
(74) *Attorney, Agent, or Firm* — Staas & Halsey LLP

(57) ABSTRACT

A method, medium, and apparatus hierarchically coding/decoding audio data, such as bit sliced arithmetic coding (BSAC), such that payloads of audio data and extension data can be grouped and interleaved according to priority so that some groups of the payloads are dropped, and the remainder of groups are transmitted. Therefore, extension data that is more important than a top layer of audio data, in terms of reproducing of original sounds, can be transmitted with priority.

26 Claims, 10 Drawing Sheets

OTHER PUBLICATIONS

PCT International Search Report, mailed Jan. 29, 2007, and issued in corresponding International Patent Application No. PCT/KR2006/004098.

Feiten Bernhard et al., "Audio Adaptation According to Usage Environment and Perceptual Quality Metrics", IEEE Transactions on Multimedia IEEE Service Center, Piscataway, NJ, US LNKD-DOI: 10-1109/TMM.2005.846793, vol. 7, No. 3, Jun. 1, 2005, pp. 446-453.

Extended European Search Report issued Apr. 19, 2010, corresponds to European Patent Application No. 06799178.6-1224.

J. Herre et al, "The Reference Model Architecture for MPEG Spatial Audio Coding", Audio Engineering Society Convention Paper New York, NY, US, May 28, 2005, pp. 1-13, XP003011724.

European Invitation pursuant to Article 94(3) and Rule 71(1) EPC dated Sep. 22, 2011 corresponds to European Patent Application No. 06799181.0.

* cited by examiner

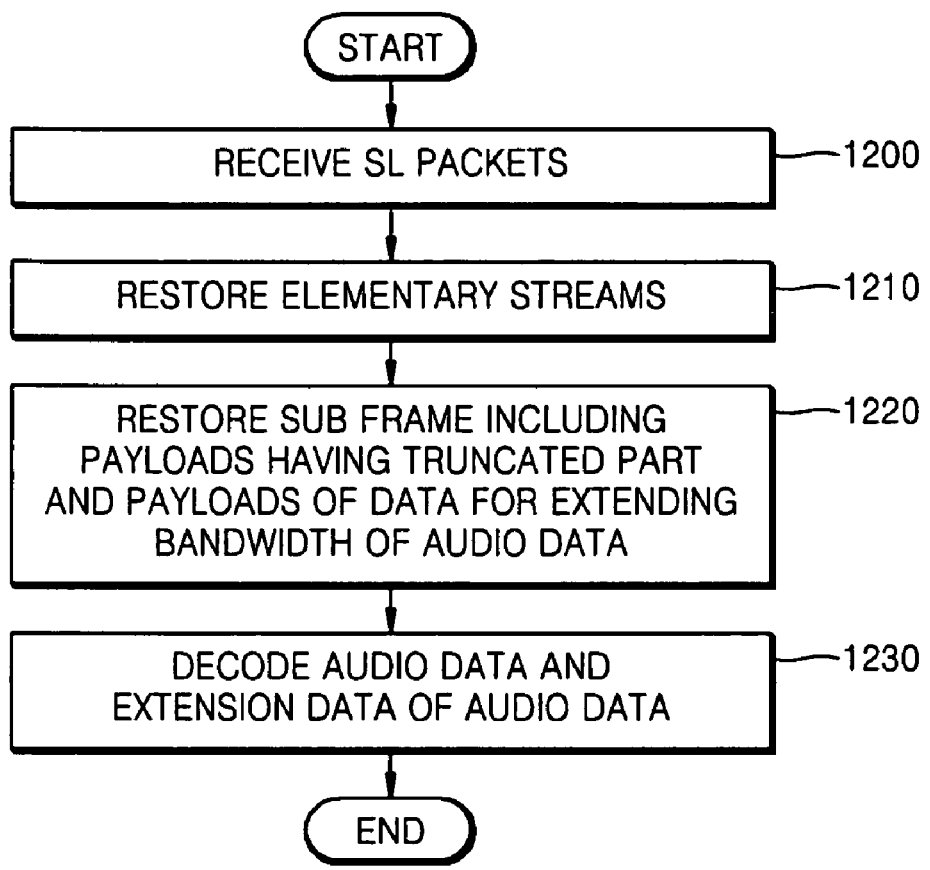

BIT-STREAM PROCESSING/TRANSMITTING AND/OR RECEIVING/PROCESSING METHOD, MEDIUM, AND APPARATUS

CROSS-REFERENCE TO RELATED APPLICATIONS

This application claims the benefit of U.S. Provisional Application No. 60/725,317, filed on Oct. 12, 2005, and No. 60/726,159, filed on Oct. 14, 2006, and priority of Korean Patent Application Nos. 10-2006-0049081 and 10-2006-0049082, both filed on May 30, 2006, No 10-2006-0067705, filed Jul. 19, 2006, and No 10-2006-0095040, filed Sep. 28, 2006, in the Korean Intellectual Property Office, the disclosures of which are incorporated herein in their entirety by reference.

BACKGROUND OF THE INVENTION

1. Field of the Invention

An embodiment of the present invention relates to a method, medium, and apparatus coding/decoding audio data, and more particularly, to a method, medium, and apparatus hierarchically coding/decoding audio data such as through bit sliced arithmetic coding (BSAC).

2. Description of the Related Art

There are two ways to transmit a bit sliced arithmetic coding (BSAC) payload to support a fine granular scalability (FGS) capability. The first way is to drop elementary streams for a BSAC access unit. In this case, the access unit is defined as an independently accessible portion of an elementary stream. The access unit is the smallest data unit that can contain timing information. The second way is to truncate the BSAC payload on a server side providing audio data, that is, a coder side. The former occurs on a sync layer and a deliver layer, while the latter occurs on a compression layer. The two techniques can also be used simultaneously.

When a bit-stream is transmitted to a decoder by hierarchically coding audio data in a coder using the aforementioned transmission techniques, a problem conventionally lies in that there is no solution to effectively transmit the hierarchically coded audio data along with extension data that can form audio data, such as data for extending a channel of audio data to a multi-channel, data for extending a bandwidth of audio data, and data for generating a cyclic redundancy code (CRC) for checking a transmission error of audio data, for example.

Accordingly, there is a need to overcome these conventional drawbacks.

SUMMARY OF THE INVENTION

An embodiment of the present invention provides an apparatus, medium, and method enhancing audio data scalability and providing backward compatibility so as to support conventional hierarchical coding techniques.

An embodiment of the present invention also provides an apparatus, medium, and method taking into account importance of extension data and an audio data band to provide scalable transmission.

Additional aspects and/or advantages of the invention will be set forth in part in the description which follows and, in part, will be apparent from the description, or may be learned by practice of the invention.

To achieve at least the above and/or other aspects and advantages, embodiments of the present invention include a method of processing/transmitting a bit-stream, the method including coding audio data and at least one extension data for the audio data, interleaving payloads resulting from the coding by grouping the payloads into a plurality of grouped and interleaved payloads, and electively dropping at least one group of the plurality of grouped and interleaved payloads.

To achieve at least the above and/or other aspects and advantages, embodiments of the present invention further include an apparatus processing/transmitting a bit-stream, the apparatus including a coder to code audio data and at least one extension data for the audio data, an interleaving unit to interleave payloads resulting from the coding by grouping the payloads into a plurality of grouped and interleaved payloads, and a transmitter to selectively drop at least one group of the plurality of grouped and interleaved payloads, and to transmit a remainder of groups not selectively dropped.

To achieve at least the above and/or other aspects and advantages, embodiments of the present invention still further include a method of processing/transmitting a bit-stream, the method including coding audio data and at least one extension data for the audio data, truncating selective payloads resulting from the coding, and transmitting the truncated payloads.

To achieve at least the above and/or other aspects and advantages, embodiments of the present invention still further include an apparatus processing/transmitting a bit-stream, the apparatus including a coder to code audio data and at least one extension data for the audio data, a truncator to selectively truncate payloads resulting from coding of the coder, and a transmitter to transmit the truncated payloads.

To achieve at least the above and/or other aspects and advantages, embodiments of the present invention still further include a method of receiving/processing a bit-stream, the method including receiving grouped and interleaved payloads, restoring the grouped and interleaved payloads to original form restored payloads, and decoding audio data included in the restored payloads and at least one extension data for the audio data.

To achieve at least the above and/or other aspects and advantages, embodiments of the present invention still further include an apparatus receiving/processing a bit-stream, the apparatus including a receiver to receive grouped and interleaved payloads, a restorer to restore the grouped and interleaved payloads to original form restored payloads, and a decoder to decode audio data included in the restored payloads and at least one extension data for the audio data.

To achieve at least the above and/or other aspects and advantages, embodiments of the present invention still further include a method of receiving/processing a bit-stream, the method including receiving payloads having truncated portions, restoring the payloads having the truncated portions to original form restored payloads, and decoding audio data included in the restored payloads and at least one extension data for the audio data.

To achieve at least the above and/or other aspects and advantages, embodiments of the present invention include at least one medium including computer readable code to control at least one processing element to implement an embodiment of the present invention.

To achieve at least the above and/or other aspects and advantages, embodiments of the present invention further include an apparatus receiving/processing a bit-stream, the apparatus including a receiver to receive payloads having truncated portions, a restorer to restore the payloads having the truncated portions to original form restored payloads, and a decoder to decode audio data included in the restored payloads and at least one extension data for the audio data.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 12 illustrates a bit-stream receiving/processing method, according to another embodiment of the present invention.

DETAILED DESCRIPTION OF THE PREFERRED EMBODIMENTS

Figure 1:
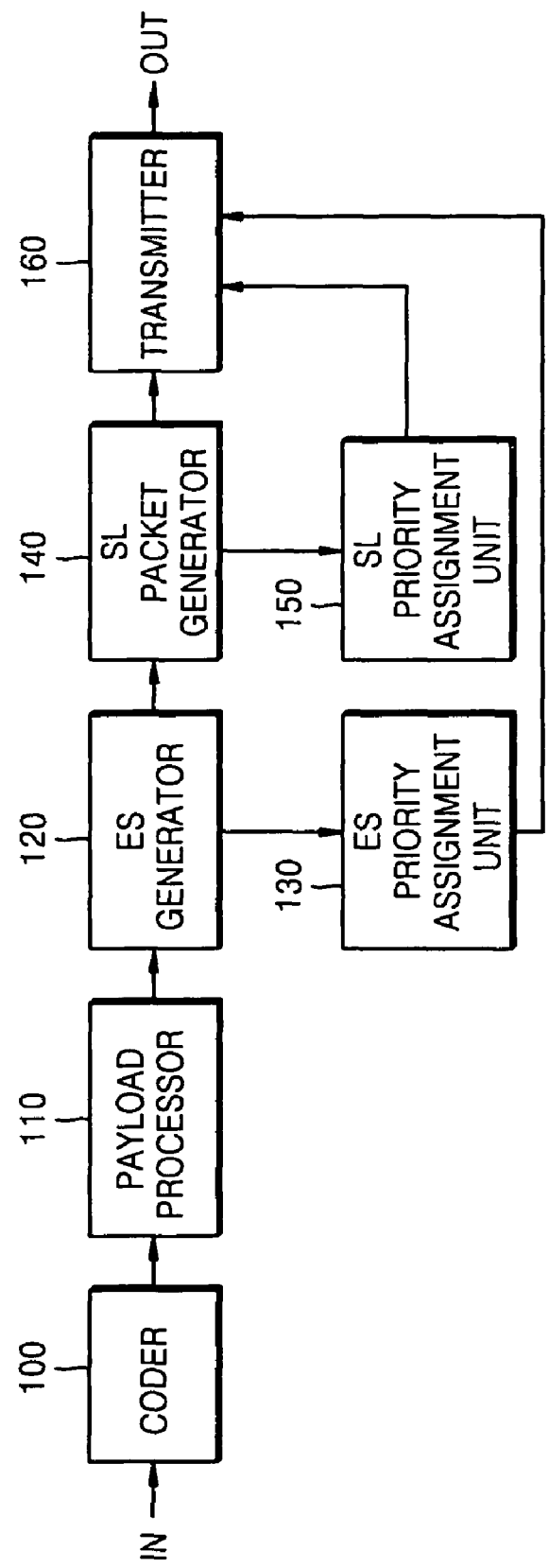
FIG. 1 illustrates a bit-stream processing/transmitting apparatus, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a bit-stream processing and/or transmitting apparatus, according to an embodiment of the present invention. The bit-stream processing/transmitting apparatus may include a coder 100, a payload processor 110, an elementary stream (ES) generator 120, an ES priority assignment unit 130, a sync layer (SL) packet generator 140, a SL priority assignment unit 150, and a transmitter 160, for example.

The coder 100 may hierarchically code audio data and extension data of the audio data. In an embodiment, the audio data may be coded by using a bit sliced arithmetic coding (BSAC) method. Examples of the extension data of the audio data may include data for extending a channel of audio data to a multi-channel, data for extending a bandwidth of audio data, and data for generating a cyclic redundancy code (CRC) for checking a transmission error of audio data, for example. In addition, additional extension data of the audio data may include meta data of the audio data or a fill element of the audio data, noting that embodiments are not limited to the same. When the extension data of the audio data is coded, the coder 100 may code at least one of the aforementioned examples of the extension data of the audio data.

When an elementary stream is dropped for a technique using an access unit among payload transmission techniques, the payload processor 110 may group and interleave payloads so that some of the payloads included in one sub frame resulting from the coding of the coder 100 and some of the payloads included in another sub frame belong to one group. In a MPEG standard, an access unit is defined as an independently accessible portion in an elementary stream, and is the smallest data unit that can contain timing information.

The ES generator 120 may generate elementary streams corresponding to payload groups on a compression layer from the payloads that are grouped and interleaved by the payload processor 110. Here, the compression layer is defined as a layer that receives a coding result of the coder 100, for example, and thus generates elementary streams.

The ES priority assignment unit 130 may assign priorities to the elementary streams, e.g., as generated by the ES generator 120. More specifically, the ES priority assignment unit 130 may assign priorities to the respective elementary streams according to a transmission priority, on a decoder side. Accordingly, the respective elementary streams, generated by the ES generator 120, may have a priority specified in an ES descriptor.

The SL packet generator 140 may generate SL packets corresponding to payload groups on a sync layer from the elementary streams, e.g., as generated by the ES generator 120. The sync layer is defined as a layer that generates SL packets providing sync information between an audio data coder and an audio data decoder by adapting elementary streams.

The SL priority assignment unit 150 may assign priorities to the respective SL packets, e.g., as generated by the SL packet generator 140. More specifically, according to an embodiment, the SL priority assignment unit 150 assigns priorities to the respective SL packets according to the transmission priority on the decoder side. Accordingly, the priority assigned to the respective elementary streams by the ES priority assignment unit 130 and the priority assigned to the respective SL packets by the SL priority assignment unit 150 enable several elementary streams to be dropped for scalable transmission on a sync layer and a delivery layer.

The transmitter 160 may drop some of the SL packets and transmit the remainder of the SL packets based on the priorities of the respective elementary streams, e.g., as assigned by the ES priority assignment unit 130, and the priorities of the respective SL packets, e.g., as assigned by the SL priority assignment unit 150. More specifically, the transmitter 160 may determine a total bit-rate for transmitting SL packets by considering the transmission environment between a coder side and a decoder side. Further, the transmitter 160 may drop the SL packets in descending order of values, obtained by subtracting priorities of SL packets from priorities of elementary streams, and transmit the remainder of SL packets.

Figure 2:
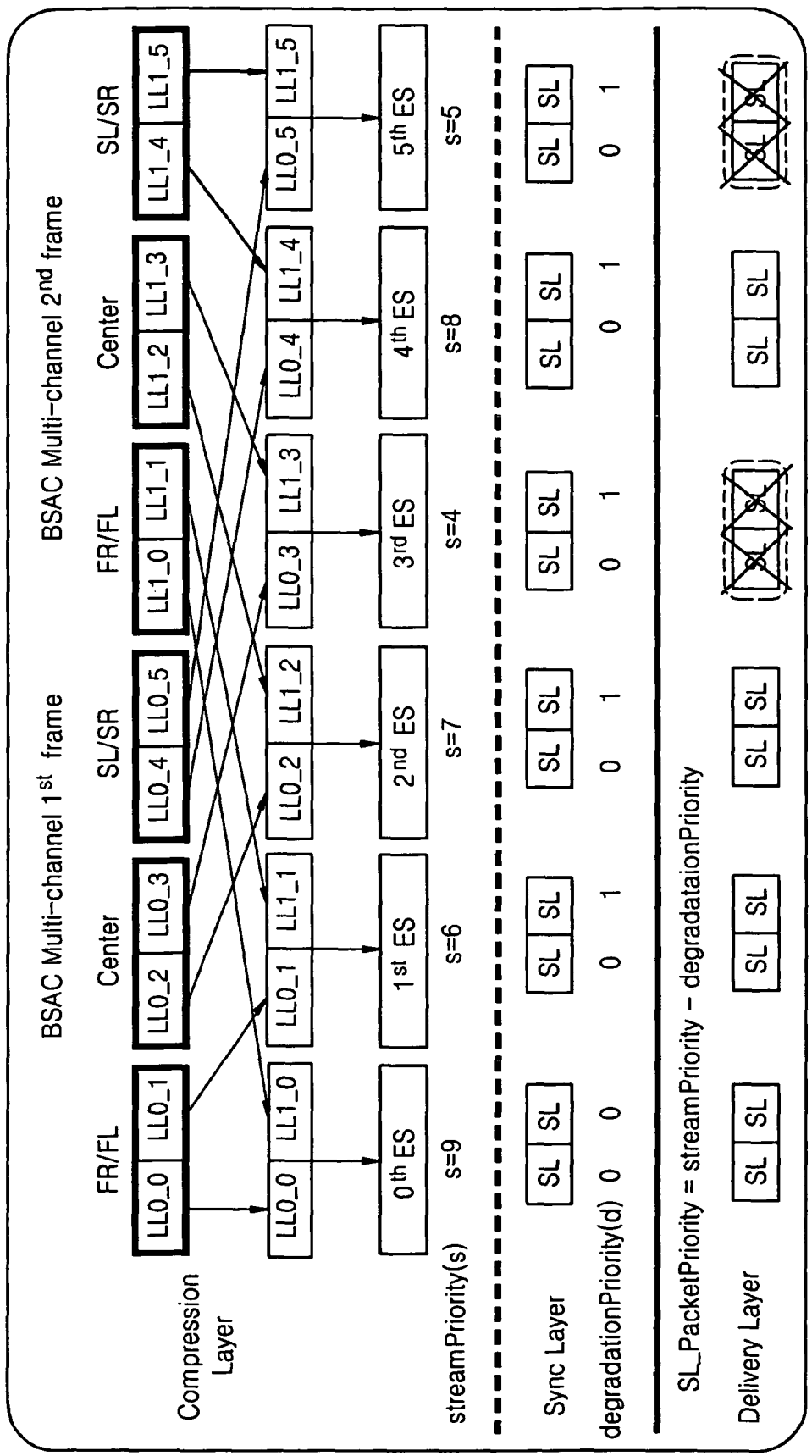
FIG. 2 illustrates a dropping of an elementary stream, according to an embodiment of the present invention.

FIG. 2 illustrates a dropping of an elementary stream, e.g., in a bit-stream processing/transmitting apparatus, according to an embodiment of the present invention.

Here, FIG. 2 shows scalable transmission of BSAC audio data and extension data thereof when extension data of audio data is data for extending a channel of audio data to a multi-channel. That is, this illustration shows scalable transmission of BSAC payloads corresponding to 'BSAC channel extension'.

As illustrated in FIG. 2, the number of sub frames may be set to 2, and four SL packets having low priorities may be dropped. Here, the number of the sub frames is not limited to 2 in embodiments of the present invention, i.e., one or more sub frames may equally be used. Similarly, the number of dropped SL packets may occasionally change. The dropped packets correspond to a top layer of the BSAC payloads of audio data included in a center (C) channel and a surround left (SL)/surround right (SR) channel corresponding to extension data of the audio data. Accordingly, audio data of each channel can be evenly reproduced by allowing a base layer corresponding to a low frequency band to be transmitted with priority for audio data of each channel.

In FIG. 2, the payload processor 110, for example, may group and interleave BSAC payloads resulting from the coding of the coder 100 so that some of the payloads of audio data and some of the payloads of data for extending a channel of audio data belong to one group.

For example, if 5.1 channel audio data is used in an embodiment, the payload processor 110, for example, may group and interleave payloads so that a base layer LL0_0 and a base layer LL1_0 belong to one group, wherein the base layer LL0_0 is included in each layer's payloads of audio data for a front left (FL) channel and a front right (FR) channel resulting from the coding of the coder 100 with respect to the FL channel and the FR channel, and the base layer LL1_0 is included in each layer's BSAC payloads of audio data for a SL channel and a SR channel resulting from the coding of the coder 100 with respect to the SL channel and the SR channel.

Further, the payload processor 110, again as an example, may group and interleave payloads so that a top layer LL0_1 and a top layer LL1_1 belong to one group, wherein the top layer LL0_1 is included in each layer's BSAC payloads of audio data for the FL channel and the FR channel resulting from the coding of the coder 100 with respect to the FL channel and the RF channel, and the top layer LL1_1 is included in each layer's BSAC payloads of audio data for a SL channel and a SR channel resulting from the coding of the coder 100 with respect to the SL channel and the SR channel.

The ES generator 120, for example, may generate a 0th elementary stream from the payloads LL0_0 and payloads LL1_0 which have been grouped and interleaved to be one group, e.g., by the payload processor 110. Subsequently, as illustrated in FIG. 2, the ES priority assignment unit 130, for example, may assign a priority of 9 to the 0th elementary stream generated by the ES generator 120. The SL packet generator 140 may, thus, generate two SL packets from the 0th elementary stream generated by the ES generator 120. Thereafter, the SL priority assignment unit 150 may assign a priority of 0 to the respective SL packets, as generated by the SL packet generator 140. Likewise, the rest of payloads illustrated in FIG. 2 may subject to the same process.

According to the total bit-rate for transmission of SL packets, the transmitter 160 may drop the four SL packets in the descending order of values obtained by subtracting the priority of SL packets from priority of elementary streams, and transmit the remainder of SL packets. Here, though the embodiment of FIG. 2 has been described with reference to aspects of FIG. 1, it should be noted that embodiments of the present invention should not be limited thereto. Similarly, though method features may hereafter be described with reference to aspects of apparatuses described herein, the method features should not be limited thereto or require combination of the same.

Figure 3:
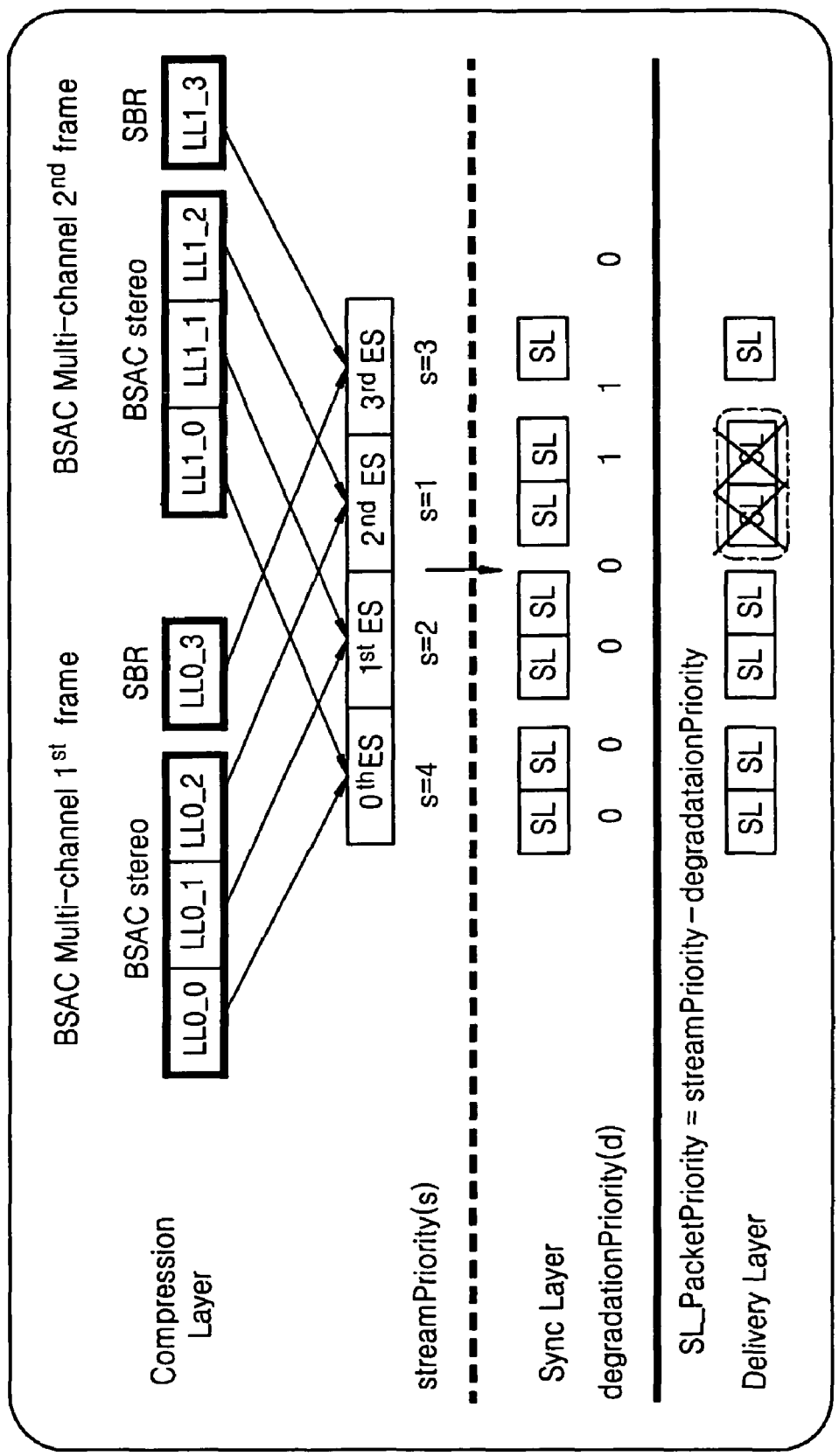
FIG. 3 illustrates another dropping of an elementary stream, according to an embodiment of the present invention.

FIG. 3 illustrates another dropping of an elementary stream, according to an embodiment of the present invention.

Here, FIG. 3 illustrates a scalable transmission of audio data and extension data thereof when the extension data of stereo audio data is data for extending a bandwidth of audio data. That is, FIG. 3 illustrates scalable transmission of BSAC payloads resulting from the coding performed by using 'BSAC spectral band replication (SBR) enhancement'.

In the example illustrated in FIG. 2, the number of sub frames is set to 2, and two SL packets having low priority are dropped. However, the number of the sub frames is not limited to 2 in the present invention, and thus one or more sub frames may be used. Further, the number of dropped SL packets may occasionally change. The dropped packets correspond to a top layer of each layer's BSAC payloads of stereo audio data included in a first sub frame and a top layer of each layer's BSAC payloads of stereo audio data included in a second sub frame. Accordingly, a total bit-rate to be transmitted can be reduced by increasing the dropped SL packets. The total bit-rate to be transmitted is reduced and results in graceful degradation in sound quality where high frequency signals in association with the top layer are reconstructed with a SBR tool.

In FIG. 3, the payload processor 110, for example, may group and interleave BSAC payloads resulting from a coding, e.g., of the coder 100, so that some of the BSAC payloads of audio data included in the first sub frame and some of the BSAC payloads of audio data included the second sub frame belong to one group, while a payload of data for extending a bandwidth of audio data included in the first sub frame and a payload of data for extending a bandwidth of audio data included in the second sub frame belong to one group.

For example, if stereo audio data is used in an embodiment of the present embodiment, the payload processor 110, for example, may group and interleave payloads so that the base layer LL0_0 and the base layer LL1_0 belong to one group, wherein the base layer LL0_0 is included in each layer's BSAC payloads of audio data for the FL channel and the FR channel included in the first sub frame resulting from the coding of the coder 100, for example, with respect to the FL channel and the FR channel, while the base layer LL1_0 is included in each layer's BSAC payloads of audio data for the FL channel and the FR channel included in the second sub frame. Likewise, the rest of the layers of audio data for the FL channel and the FR channel may be subject to the same process.

Further, the payload processor 110, for example, may group and interleave payloads so that a BSAC payload LL0_3 and a BSAC payload LL1_3 belong to one group, wherein the BSAC payload LL0_3 is included in data for extending a bandwidth of audio data for the FL channel and the FR channel included in the first sub frame resulting from the coding of the coder 100, for example, while the BSAC payload LL1_3 is included in data for extending a bandwidth of audio data for the FL channel and the FR channel included in the second sub frame.

The ES generator 120, for example, may generate a 0th elementary stream from the payloads LL0_0 and payloads LL1_0, e.g., which may have been grouped and interleaved to be one group by the payload processor 110. Likewise, the rest of the layers of the audio data for the FL channel and the FR channel are subject to the same process.

Further, the ES generator 120 may generate a third elementary stream from the payloads LL0_3 and payloads LL1_3, e.g., which may have been grouped and interleaved to be one group by the payload processor 110. Subsequently, the ES priority assignment unit 130, for example, may assign a priority of 9 to the 0th elementary stream generated by the ES generator 120. Likewise, the rest of the layers of the audio data for the FL channel and the FR channel may be subject to the same process. Further, the ES priority assignment unit 130 may assign a priority of 3 to the third elementary stream generated by the ES generator 120.

Thereafter, the SL packet generator 140, for example, may generate two SL packets from the respective elementary streams, e.g., as generated by the ES generator 120. Then, the SL priority assignment unit 150, for example, may assign priority to the respective SL packets generated by the SL packet generator 140. According to the total bit-rate for transmission of SL packets, the transmitter 160 may drop the two SL packets in the descending order of values obtained by subtracting priority of SL packets from priority of elementary streams, and transmit the remainder of SL packets.

Figure 4:
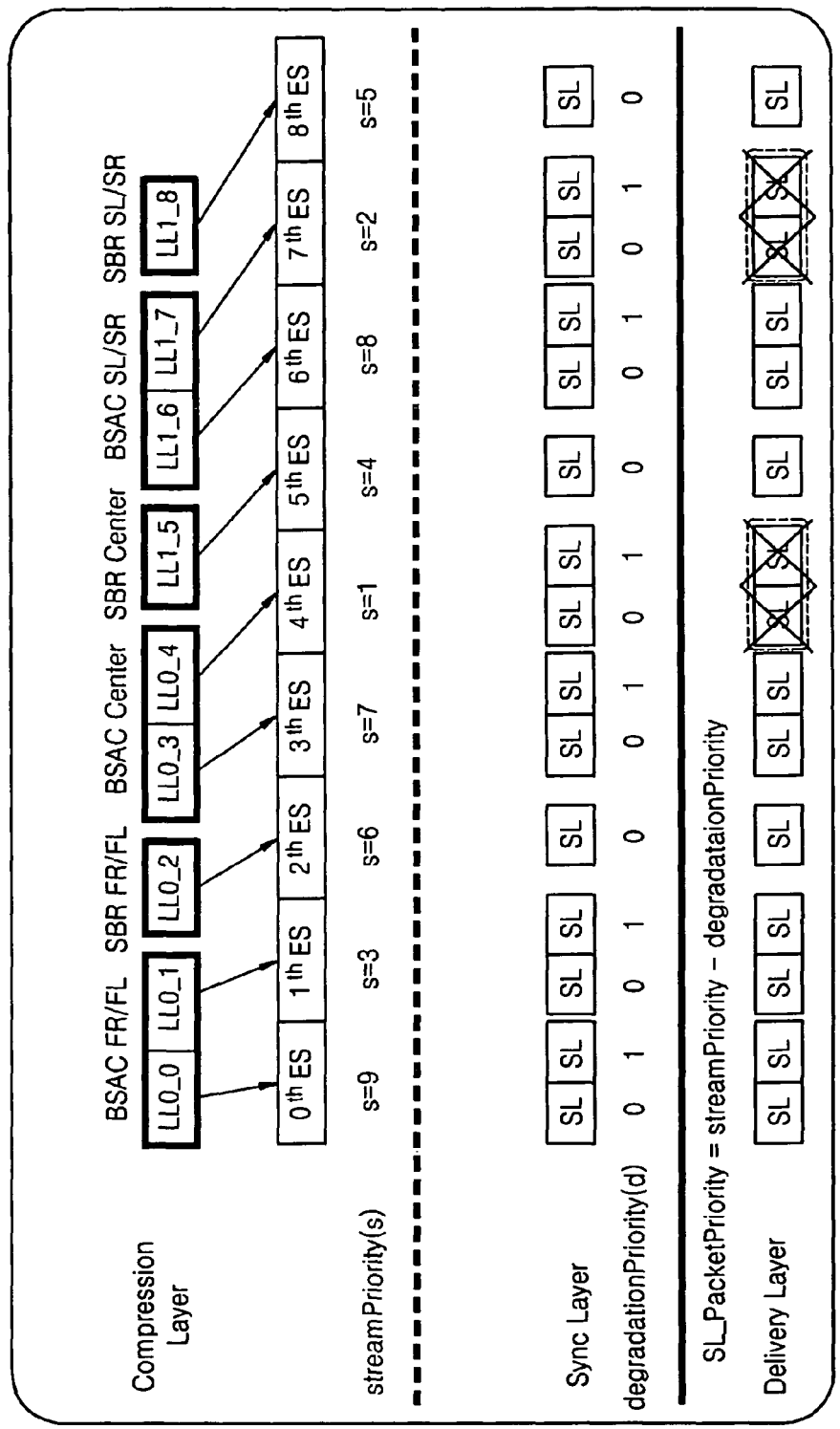
FIG. 4 illustrates another dropping of an elementary, according to an embodiment of the present invention.

FIG. 4 further illustrates another dropping of an elementary stream, e.g., in a bit-stream processing/transmitting apparatus, according to an embodiment of the present invention.

Here, FIG. 4 illustrates scalable transmission of BSAC audio data and extension data thereof when extension data of audio data is data for extending a channel of audio data. That is, this embodiment includes scalable transmission of 'BSAC channel extension with SBR'.

As illustrated in FIG. 4, four SL packets having a low priority may be dropped. However, it is briefly noted that the number of the sub frames is not limited to 1 in embodiments of the present invention, and thus one or more sub frames may be used. Further, the number of dropped SL packets may also occasionally change.

In FIG. 4, the payload processor 110, for example, may group and interleave payloads resulting from the coding of the coder 100, for example, so that some of the BSAC payloads of audio data, some of the payloads of data for extending a channel of audio data to a multi-channel, and payloads of data for extending a bandwidth of audio data belong to one group.

The ES generator 120 may, thus, generate a 0th elementary stream from the payloads LL0_0, which may have been grouped and interleaved to be one group by the payload processor 110. Subsequently, the ES priority assignment unit 130 may assign a priority of 9 to the 0th elementary stream, as generated by the ES generator 120, for example. The SL packet generator 140 may generate two SL packets from the 0th elementary stream generated by the ES generator 120. Thereafter, the SL priority assignment unit 150 may assign priorities of 0 and 1 to the respective SL packets generated by the SL packet generator 140. Likewise, the remainder of the payloads illustrated in FIG. 4 may be subject to the same process.

According to the total bit-rate for transmission of SL packets, the transmitter 160, thus, may drop the four SL packets in descending order of values, as obtained by subtracting priorities of SL packets from priorities of elementary streams, and transmit the remainder of SL packets.

Figure 5:
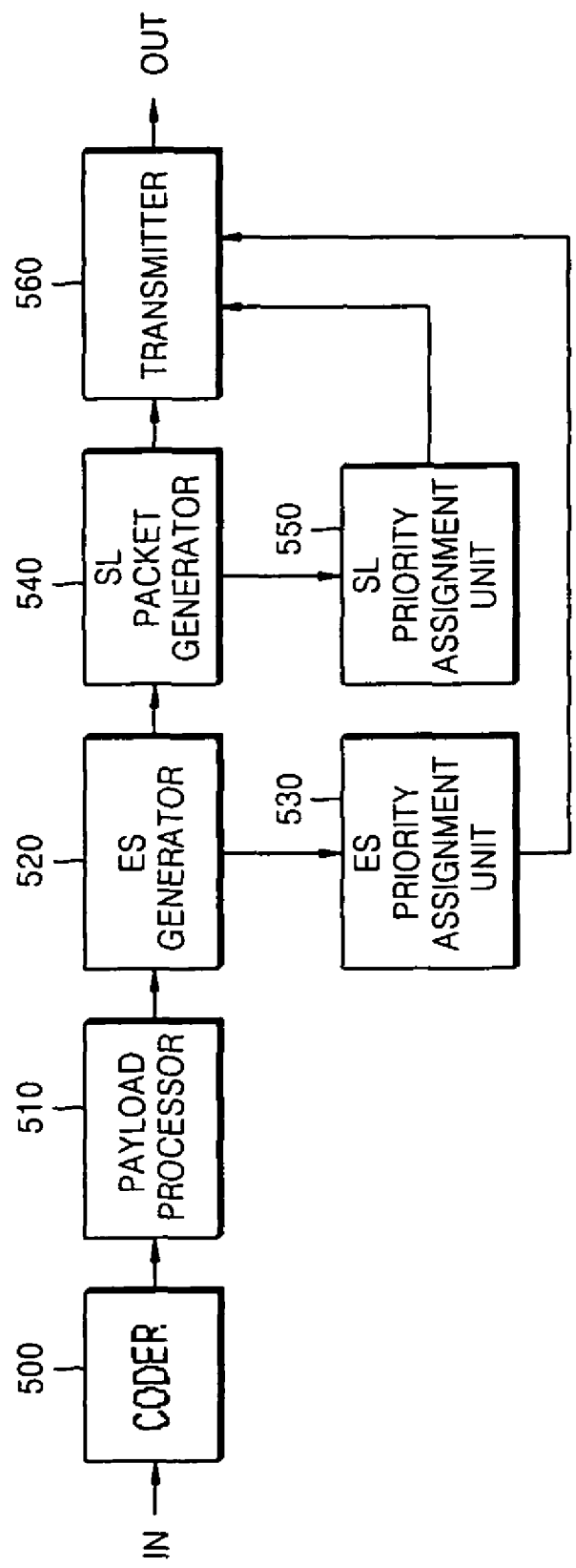
FIG. 5 illustrates a bit-stream processing/transmitting apparatus, according to another embodiment of the present invention.

FIG. 5 illustrates a bit-stream processing/transmitting apparatus, according to another embodiment of the present invention. The bit-stream processing/transmitting apparatus may include a coder 500, a payload processor 510, an ES generator 520, an ES priority assignment unit 530, a SL packet generator 540, a SL priority assignment unit 550, and a transmitter 560, for example.

The coder 500 may hierarchically code audio data and extension data of the audio data. In such an embodiment, the audio data may be coded according to a BSAC technique. Examples of extension data of the audio data may include data for extending a channel of audio data to a multi-channel, data for extending a bandwidth of audio data, and data for generating a CRC code for checking a transmission error of audio data, for example. In addition to the aforementioned extension data, the extension data of the audio data may also be meta data of the audio data or may include a fill element of the audio data, for example, again noting that embodiments of the present invention are not limited thereto. When the extension data of the audio data is coded, the coder 500 may thus code at least one of the aforementioned examples of the extension data of the audio data.

The payload processor 510 may truncate some of the payloads included in one sub frame resulting from the coding of the coder 500 along with some of the payloads included in another sub frame by considering a transmission environment between a coder side and a decoder side, for example, by considering the number of layers that can be determined according to a payload from a back-channel.

The payload processor 510 may truncate some of the payloads with a 'light-weight server process'. In an embodiment, the light-weight server process is defined as an additional process required to truncate some of the payloads, for example, to parse a bit-stream. The term 'light-weight' is used because processing and transmission of payloads are simpler when in comparison with a method of dropping an elementary stream for an access unit among transmission techniques of BSAC payloads.

Further, the payload processor 510 may truncate only some of the payloads of audio data, and not truncate a payload of extension data of the audio data. Therefore, the payload processor 510 may separate a payload of audio data from a payload of extension data by parsing a bit-stream, and truncate only some of the payloads which do not belong to extension data according to the result of separation.

Here, the syntax of 'zero_code' and the 'sync_word' can be used for such separation in BASC. That is, the payload processor 510 may identify the payload of extension data by using the 'zero_code' and the 'sync_word', and truncate only some of the payloads which do not belong to the payload of extension data. The payload processor 510 may, thus, concatenate the 'zero_code' and the 'sync_word' at the end of the truncated payload so that an access unit can be extracted from the transmitted elementary stream (ES) when an audio data decoder checks the 'zero_code' and the 'sync_word syntax'. If there is no payload of extension data, the process is rather easy since the aforementioned separation may not be needed.

Further, the payload processor 510 may determine a target bit-rate by considering the transmission environments between the coder side and the decoder side, calculate the number of target layers according to the target bit-rate, and truncate some of the payloads depending on the number of target layers.

The ES generator 520 may generate one elementary stream corresponding to payload groups on the compression layer from the payloads truncated by the payload processor 510, and may further generate another elementary stream from the payload of extension data. The ES priority assignment unit 530 may, thus, assign priorities to the elementary streams generated by the ES generator 520. Subsequently, the SL packet generator 540 may generate SL packets corresponding to payload groups on the sync layer from elementary streams generated by the ES generator 520. The SL priority assignment unit 550 may further assign priorities to the respective SL packets generated by the SL packet generator 540. The transmitter 560 may then transmit the SL packets generated by the SL packet generator 540. As described above, the ES generator 520, the SL packet generator 540, and the transmitter 560 are not subject to any special process for scalable transmission, according to an embodiment of the present embodiment.

Figure 6:
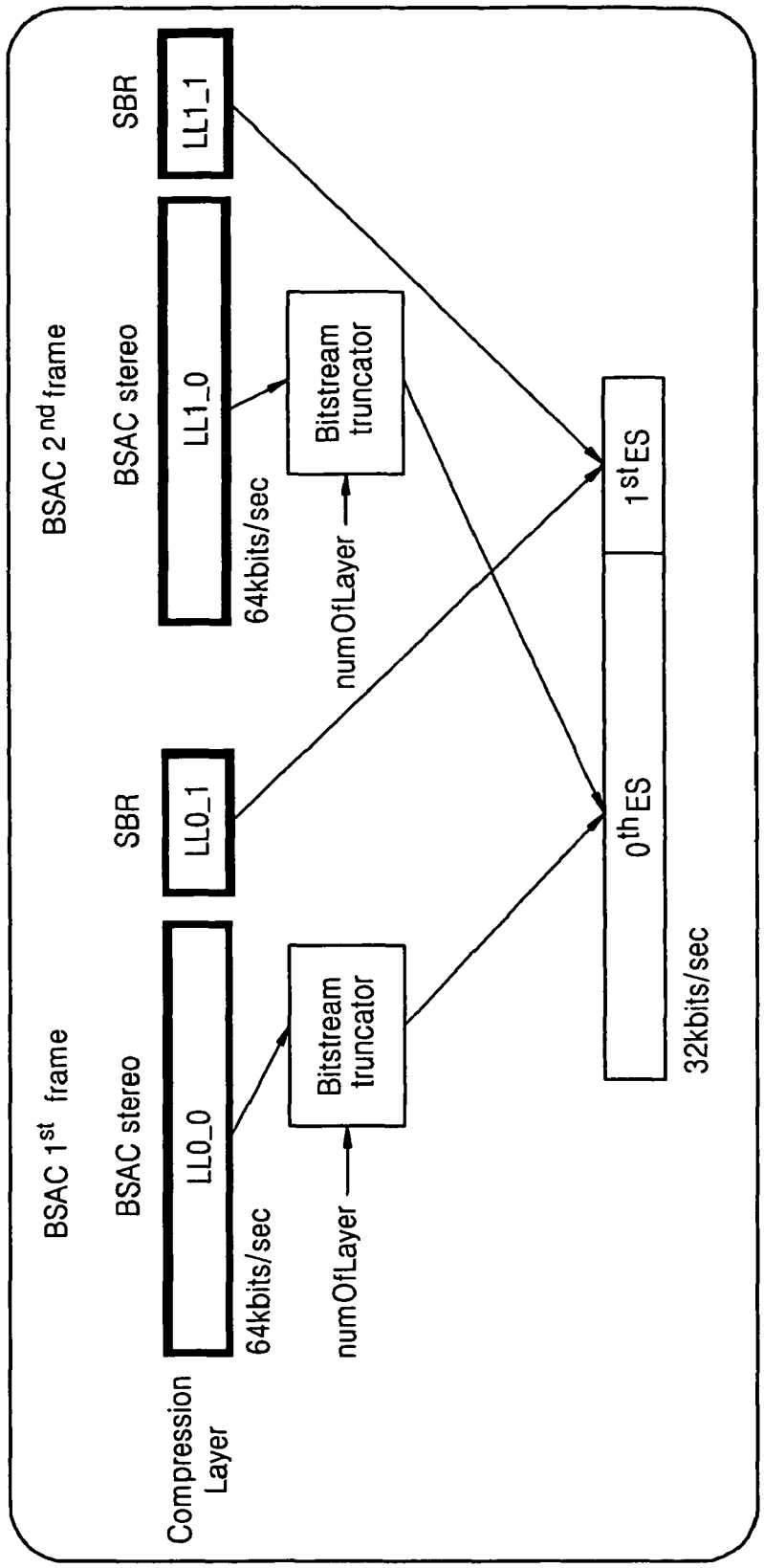
FIG. 6 illustrates a truncating of a payload, according to an embodiment of the present invention.

FIG. 6 illustrates a truncating of a payload, e.g., in a bit-stream processing/transmitting apparatus, according to an embodiment of the present invention.

Here, FIG. 6 illustrates scalable transmission of audio data and extension data thereof when extension data of stereo audio data is data for extending a bandwidth of audio data.

That is, this embodiment shows the scalable transmission of a payload resulting from a coding performed by using 'BSAC SBR enhancement'.

Referring to FIG. 6, the number of sub frames may be set to 2, only as an example. In this case, the payload processor 510, for example, may truncate a portion of each layer's payloads LL0_0 of stereo audio data included in the first sub frame and a portion of each layer's payloads LL1_0 of stereo audio data included in the second sub frame. The ES generator 520 may, thus, generate a 0th elementary stream from the payloads LL0_0 and LL1_0, e.g., as truncated by the payload processor 510, and generate a first elementary stream from the data LL0_1 and LL1_1 for extending a bandwidth of audio data.

Figure 7:
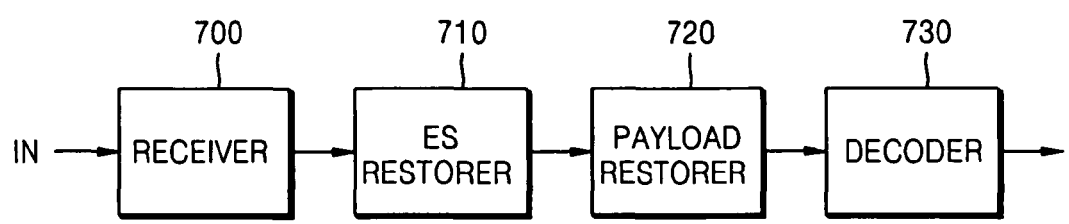
FIG. 7 illustrates a bit-stream receiving/processing apparatus, according to an embodiment of the present invention.

FIG. 7 illustrates a bit-stream receiving and/or processing apparatus, according to an embodiment of the present invention. The bit-stream receiving/processing apparatus may include a receiver 700, an ES restorer 710, a payload restorer 720, and a decoder 730, for example. As will be describe below, with the embodiment of FIG. 7, a corresponding method of dropping an elementary stream can equally be implemented.

Accordingly, the receiver 700 may receive a bit-stream in a specific packet format through an input terminal IN, for example, and thus receives SL packets including some of the payloads grouped and interleaved, e.g., such as those grouped and interleaved by a bit-stream processing/transmitting apparatus similar to that of FIG. 1. According to an embodiment, the receiver 700 may receive some of the payloads included in one sub frame and some of the payloads included in another sub frame, as one group.

In a case similar to that illustrated in FIG. 2, the receiver 700 may receive a base layer on each layer's BSAC payloads of audio data and a base layer of payloads of each layer of data for extending a channel of this audio data as one group. Further, the receiver 700 may receive a top layer on each layer's payloads of audio data and a top layer on each layer's payloads of data for extending a channel of this audio data.

In a case similar to that illustrated in FIG. 3, the receiver 700 may receive some BSAC payloads of audio data included in one of sub frame and some BSAC payloads of audio data included in another sub frame as one group. Further, the receiver 700 may further receive a payload of data for extending a bandwidth of audio data included in one sub frame and a payload of data for extending a bandwidth of audio data included in another sub frame, as one group.

The ES restorer 710 may then parse the SL packets, e.g., as received by the receiver 700, on the SL layer, and thus restore elementary streams including some of the payloads grouped and interleaved, such as those grouped and interleaved by a bit-stream processing/transmitting apparatus similar to that of FIG. 1. The SL layer is defined as a layer for performing operations required to synchronize an audio data coder and an audio data decoder, for example, an operation of extracting synchronization information between the audio data coder and the audio data decoder from SL packets.

The payload restorer 720 may restore a payload to the original form by parsing the elementary streams, such as those restored by the ES restorer 710. That is, the payload restorer 720 may restore the payloads to the original form by using the elementary streams, including some of the payloads that may have been grouped and interleaved by such a bit-stream processing/transmitting apparatus as that of FIG. 1. Here, the compression layer is defined as a layer for performing operations required to decode payloads from elementary streams.

In particular, the payload restorer 720 may obtain information on payloads in terms of the number of layers, the length, and the order by using header information on payloads included in the elementary streams restored by the ES restorer 710, wherein the header information may include information on grouped and interleaved payloads, such as those grouped and interleaved by a bit-stream processing/transmitting apparatus similar to that of FIG. 1. Thereafter, by using the obtained information, the payload restorer 720 may de-interleave the payloads received as one group, as described above, so as to restore one sub frame, and then restores another sub frame.

In a case similar to that illustrated in FIG. 2, the payload restorer 720 may restore each layer's BSAC payloads of audio data by de-interleaving the payloads received as one group, as described above, and also restore each layer's BSAC payloads of data for extending a channel of audio data.

In the a case similar to that illustrated in FIG. 3, the payload restorer 720 may restore each layer's BSAC payloads of audio data by de-interleaving the payloads received as one group, as described above, and also restore a payload of data for extending a bandwidth of audio data.

According to an embodiment, the decoder 730 may further hierarchically decode audio data included in each layer's payloads, as restored by the payload restorer 720, for example. Further, the decoder 730 may decode extension data of audio data including at least one of data for extending a channel of audio data, as restored by the payload restorer 720, to a multi-channel, data for extending a bandwidth of audio data, and data for generating a CRC code for checking for transmission errors of audio data. In addition to the aforementioned extension data, extension data of the audio data may be meta data of the audio data or may include a fill element of the audio data, for example.

Figure 8:
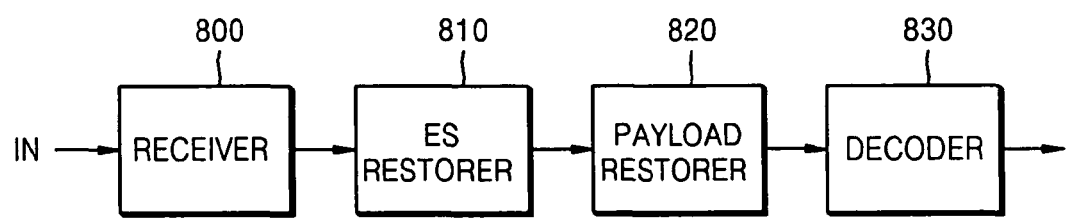
FIG. 8 illustrates a bit-stream receiving/processing apparatus, according to another embodiment of the present invention.

FIG. 8 illustrates a bit-stream receiving/processing apparatus, according to another embodiment of the present invention. The bit-stream receiving/processing apparatus may include a receiver 800, an ES restorer 810, a payload restorer 820, and a decoder 830. As will be describe below, with the embodiment of FIG. 8, a corresponding method of truncating a payload can equally be implemented.

The receiver 800 may receive a bit-stream in a specific packet format through an input terminal IN, for example, and thus receive payloads having a portion truncated by a coder, such as that of FIG. 1, and SL packets including a payload of extension data of audio data. According to an embodiment, the receiver 800 may receive some of the payloads included in one sub frame and some of the payloads included in another sub frame, as one group.

The ES restorer 810 may parse the SL packets, e.g., as received by the receiver 800, on the SL layer, and thus restore an elementary stream including the payloads having a portion truncated, e.g., by a coder such as that of FIG. 1, and also restore an elementary stream including a payload of extension data of audio data.

The payload restorer 820 may restore payloads to the original form by parsing elementary streams restored by the ES restorer 810. That is, the payload restorer 820 may restore payloads to an original form by using payloads, wherein some of the payloads of audio data may be truncated, such as by a bit-stream processing/transmitting apparatus similar to that of FIG. 1, and a payload of extension data may not be truncated.

In particular, the payload restorer 820 may restore one sub frame including payloads having a truncated portion and a payload of extension data from payloads having a truncated audio portion included in one elementary stream restored by the ES restorer 810 and a payload of extension data included in another elementary stream.

According to an embodiment, the decoder 830 may hierarchically decode audio data included in each layer's payloads, e.g., as restored by the payload restorer 820. Further, the decoder 830 may decode extension data of audio data including at least one of data for extending a channel of audio data, as restored by the payload restorer 820, to a multi-channel, data for extending a bandwidth of audio data, and data for generating a CRC code for checking a transmission error of audio data. In addition to the aforementioned extension data, extension data of the audio data may also be meta data of the audio data or may include a fill element of the audio data, for example.

In a case similar to that illustrated in FIG. 3, the payload restorer 820 may use payloads of audio data, wherein some of the payloads are truncated whereas a payload of data for extending a bandwidth of audio data is not truncated, thereby restoring the payloads to an original form. More specifically, the payload restorer 820 may restore one sub frame including payloads having a truncated portion and a payload of data for extending a bandwidth of audio data from payloads having a truncated audio data portion included in one elementary stream and a payload of data for extending a bandwidth of audio data included in another elementary stream.

Figure 9:
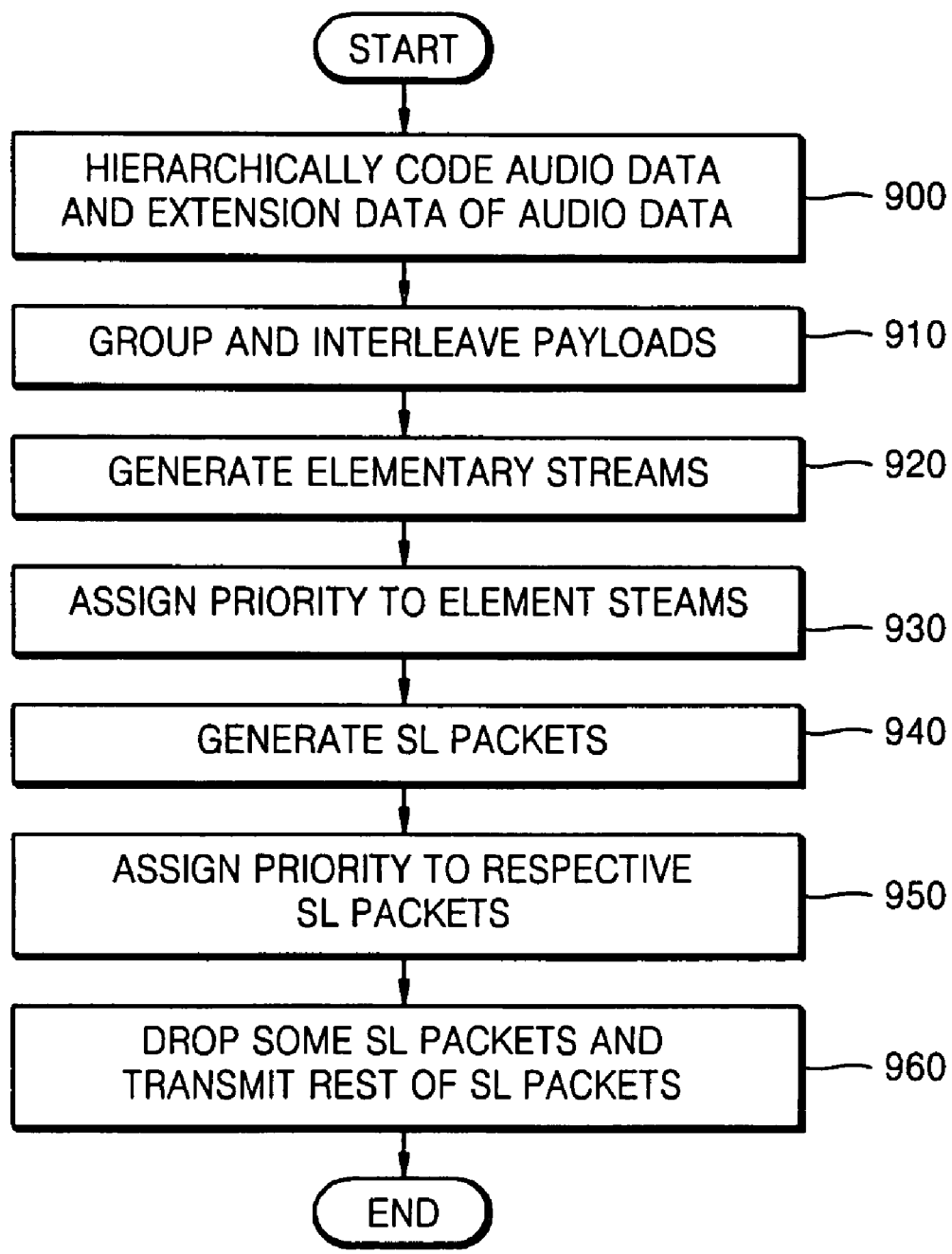
FIG. 9 illustrates a bit-stream processing/transmitting method, according to an embodiment of the present invention.

FIG. 9 illustrates a bit-stream processing/transmitting method, according to an embodiment of the present invention.

Referring to FIG. 9, the bit-stream processing/transmitting method includes operations that may be sequentially performed, in one embodiment, in a bit-stream processing/transmitting apparatus, such as that of FIG. 1, noting that embodiments are not limited thereto. Thus, although omitted, above descriptions for a bit-stream processing/transmitting apparatus may also apply to bit-stream processing/transmitting methods according to embodiments of the present embodiment.

Accordingly, audio data and extension data of the audio data may be hierarchically coded, in operation 900. In this operation, the audio data may be coded by using the BSAC method, for example. Again, examples of the extension data of the audio data may include data for extending a channel of audio data to a multi-channel, data for extending a bandwidth of audio data, and data for generating a CRC code for checking a transmission error of audio data. In addition, extension data of the audio data may also be meta data of the audio data or may include a fill element of the audio data, for example, noting that alternative embodiments are equally available. When the extension data of the audio data is coded, in operation 900, at least one of the aforementioned examples of the extension data of the audio data may also be coded.

Here, payloads may be grouped and interleaved so that some of the payloads included in one sub frame, resulting from the coding in operation 900, and some of the payloads included in another sub frame belong to one group, in operation 910. Elementary streams corresponding to payload groups on a compression layer may further be generated from grouped and interleaved payloads, such as those grouped and interleaved in operation 910, in operation 920.

Further, priority may be assigned to elementary streams, such as those generated in operation 920, in operation 930, and SL packets corresponding to payload groups on a sync layer may be generated from the elementary streams generated in operation 930, in operation 940.

Thus, priority may be assigned to the respective SL packets, such as those generated in operation 940, in operation 950.

According to the priority assigned in operations 930 and 950, some of the SL packets may, thus, be dropped and the remainder of SL packets may be transmitted, in operation 960.

Figure 10:
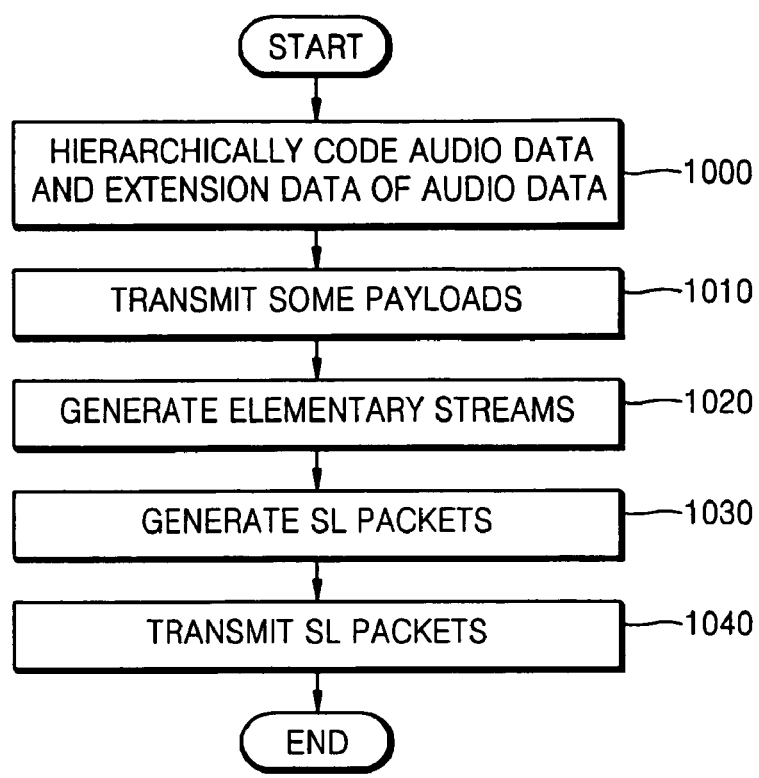
FIG. 10 illustrates a bit-stream processing/transmitting method, according to another embodiment of the present invention.

FIG. 10 illustrates a bit-stream processing/transmitting method, according to another embodiment of the present invention.

Referring to FIG. 10, the bit-stream processing/transmitting method include operations that may be sequentially performed, in one embodiment, in a bit-stream processing/transmitting apparatus, such as that of FIG. 5, noting that embodiments are not limited thereto. Thus, although omitted, above descriptions for a bit-stream processing/transmitting apparatus may also apply to bit-stream processing/transmitting methods according to embodiments of the present embodiment.

Accordingly, in one embodiment, audio data and extension data of the audio data may be hierarchically coded, in operation 1000. In this operation, the audio data may be coded by using the BSAC technique, for example. Again, examples of the extension data of the audio data may include data for extending a channel of audio data to a multi-channel, data for extending a bandwidth of audio data, and data for generating a CRC code for checking a transmission error of audio data. In addition to the aforementioned extension data, extension data of the audio data may also be meta data of the audio data or may include a fill element of the audio data, noting that embodiments of the present invention are not limited thereto. When the extension data of the audio data is coded, in operation 1000, at least one of the aforementioned examples of the extension data of the audio data may also be coded.

After operation 1000, some payloads included in one sub frame, e.g., resulting from the coding in operation 1000, may be truncated along with some of the payloads included in another sub frame by considering a transmission environment between a coder side and a decoder side, for example, by considering the number of layers that can be determined by a payload from a back-channel, in operation 1010.

One elementary stream may be generated which corresponds to payload groups on the compression layer from the payloads truncated in operation 1010, for example, and another elementary stream may further be generated from a payload of extension data, in operation 1020.

SL packets corresponding to payload groups on the SL layer may be generated from the elementary streams, such as those generated in operation 1020, in operation 1030, and then the generated SL packets may be transmitted, in operation 1040.

Figure 11:
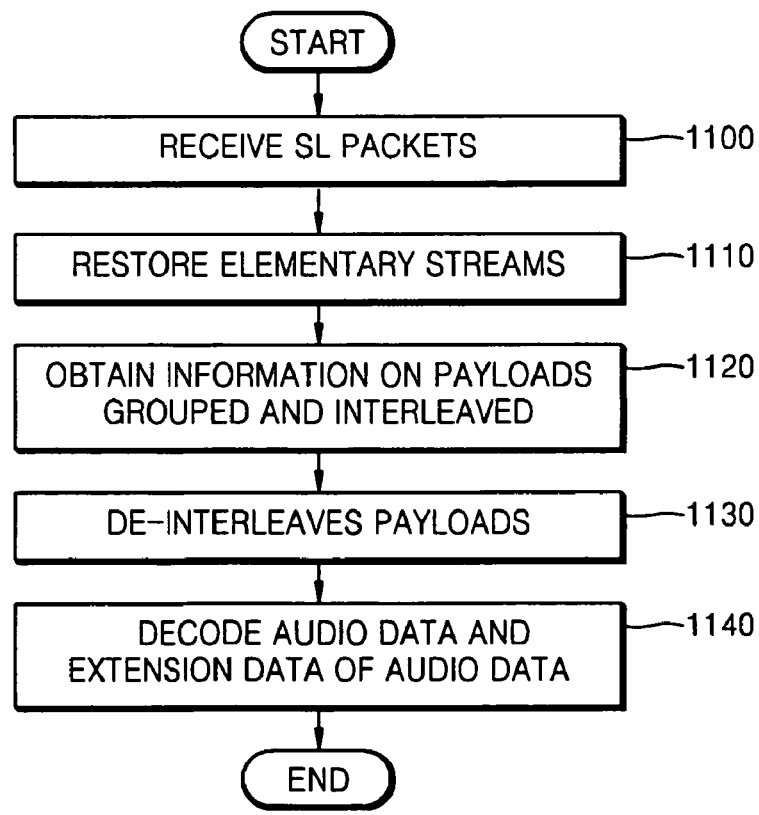
FIG. 11 illustrates a bit-stream receiving/processing method, according to an embodiment of the present invention.

FIG. 11 illustrates a bit-stream receiving/processing method, according to another embodiment of the present invention.

Referring to FIG. 11, the bit-stream receiving/processing method includes operations that may be sequentially performed, in one embodiment, in a bit-stream processing/transmitting apparatus, such as that of FIG. 7, noting that embodiments of the present invention are not limited thereto. Thus, although omitted, above descriptions for a bit-stream processing/transmitting apparatus may also apply to bit-stream processing/transmitting methods according to embodiments of the present embodiment.

Accordingly, in one embodiment, SL packets including some of the grouped and interleaved payloads, such as those grouped and interleaved by the bit-stream processing/transmitting apparatuses of FIGS. 1 and 5, may be received, in operation 1100.

Elementary streams including some of the grouped and interleaved payloads, such as those grouped and interleaved by the bit-stream processing/transmitting apparatus of FIG. 1, may further be restored by parsing the SL packets received in operation 1100, in operation 1110.

Information on payloads may be obtained in terms of the number of layers, the length, and the order by using header information on payloads included in the elementary streams restored in operation 1110, wherein the header information may include information on the grouped and interleaved payloads, such as those grouped and interleaved by the bit-stream processing/transmitting apparatuses of FIGS. 1 and 5, in operation 1120.

Payloads may be restored to an original form by de-interleaving the payloads included in the elementary streams using information obtained in operation 1120, in operation 1130.

Audio data, which may be included in each layer's payloads, restored in operation 1130, and extension data of the audio data may be hierarchically decoded, according to an embodiment, in operation 1140. Again, further in this operation, extension data of the audio data may include at least one of data for extending a channel of audio data to a multi-channel, data for extending a bandwidth of audio data, and data for generating a CRC code for checking a transmission error of audio data. In addition to the aforementioned extension data, extension data of the audio data may also be meta data of the audio data or may include a fill element of the audio data, for example.

FIG. 12 illustrates a bit-stream receiving/processing method, according to another embodiment of the present invention.

Referring to FIG. 12, the bit-stream receiving/processing method includes operations that may be sequentially performed, in one embodiment, in a bit-stream processing/transmitting apparatus, such as that of FIG. 8, noting that embodiments are not limited thereto. Thus, although omitted, above descriptions for a bit-stream processing/transmitting apparatus may also apply to bit-stream processing/transmitting methods according to embodiments of the present embodiment.

Accordingly, SL packets including some of the grouped and interleaved payloads, such as those grouped and interleaved by the bit-stream processing/transmitting apparatuses of FIGS. 1 and 5, may be received, in operation 1200.

By parsing SL packets received in operation 1200 on the SL layer, elementary streams may restored which include payloads having a portion truncated, such as by a bit-stream processing/transmitting apparatus similar to that of FIGS. 1 and 5, and an elementary stream including a payload of extension data of audio data may also be restored.

Payloads may be restored to an original form by parsing the elementary streams, as restored in operation 1210, in operation 1220. In particular, in a bit-stream receiving/processing method of this embodiment, one sub frame may be restored which includes payloads having a truncated portion and a payload of data for extending a bandwidth of audio data from payloads having a truncated audio data portion included in one elementary stream and a payload of data for extending a bandwidth of audio data included in another elementary stream.

Audio data, which is included in each layer's payloads, as restored in operation 1220, and extension data of the audio data may be hierarchically decoded, according to an embodiment of the present invention, in operation 1230. Further in this operation, extension data of the audio data may be decoded and may include at least one of data for extending a channel of audio data to a multi-channel, data for extending a bandwidth of audio data, and data for generating a CRC code for checking a transmission error of audio data. In addition to the aforementioned extension data, extension data of the audio data may be also meta data of the audio data or may include a fill element of the audio data, for example.

According to an embodiment of the present invention, payloads of audio data and extension data thereof can be grouped and interleaved according to priorities so that some groups thereof may be dropped, and the remainder of groups transmitted. Therefore, extension data that is more important than a top layer of audio data, in terms of reproducing an original sound, can be transmitted with priority.

In addition, audio data and extension data of the audio data may be coded, and some payloads of audio data truncated. Since the truncated payloads of audio data are transmitted along with a payload of extension data, it may be possible to achieve graceful degradation in sound quality while significantly reducing the total bit-rate of audio data. Thus, an embodiment of the present invention provides a solution in which the importance of extension data is taken into consideration in addition to an importance of the corresponding audio data for scalable transmission.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of processing/transmitting a bit-stream, the method comprising:

coding, performed by at least one processing device, audio data and at least one extension data for the audio data;

interleaving payloads resulting from the coding by grouping the payloads into a plurality of grouped and interleaved payloads; and selectively dropping at least one group of the plurality of grouped and interleaved payloads, wherein the extension data is at least one selected among data for extending a channel of audio data to a multi-channel, data for extending a bandwidth of audio data, and data for generating a cyclic redundancy code for checking a transmission error of audio data.

2. The method of claim 1, further comprising transmitting a remainder of groups not selectively dropped.

3. The method of claim 1, wherein, in the interleaving of the payloads, selective payloads included in one sub frame and selective payloads included in another sub frame are grouped and interleaved so as to belong to a same group.

4. The method of claim 1, wherein:
in the coding, the audio data is hierarchically coded, and the at least one extension data is for extending a channel of the audio data and is hierarchically coded; and
in the interleaving, the payloads are grouped and interleaved so that a base layer of each layer's payloads of the audio data and a base layer of each layer's payloads of the at least one extension data for extending the channel of the audio data belong to a same group.

5. The method of claim 1, wherein:
in the coding, the audio data is hierarchically coded, and the at least one extension data is for extending a channel of the audio data and is hierarchically coded; and
in the interleaving, the payloads are grouped and interleaved so that a top layer of each layer's payloads of the audio data and a top layer of each layer's payloads of the at least one extension data for extending the channel of the audio data belong to a same group.

6. The method of claim 1, wherein:
in the coding, the audio data is hierarchically coded, and the at least one extension data is for extending a bandwidth of the audio data and is hierarchically coded; and
in the interleaving, the payloads are grouped and interleaved so that a portion of payloads of audio data included in one sub frame and a portion of payloads of audio data included in another sub frame belong to a same group.

7. The method of claim 1, wherein:
in the coding, the audio data is hierarchically coded, and the at least one extension data is for extending a bandwidth of the audio data and is hierarchically coded; and
in the interleaving, the payloads are grouped and interleaved so that a payload of data for extending a bandwidth of audio data included in one sub frame and a payload of data for extending a bandwidth of audio data included in another sub frame belong to a same group.

8. The method of claim 1, further comprising:
assigning priorities to respective groups of payloads grouped and interleaved,
wherein, some of the respective groups are selectively dropped based on the assigned priorities.

9. The method of claim 1, further comprising:
generating elementary streams from the grouped and interleaved payloads; and
generating sync layer packets from the generated elementary streams,
wherein, selective generated sync layer packets are dropped.

10. The method of claim 9, further comprising transmitting a remainder of the generated sync layer packets not selectively dropped.

11. The method of claim 1, wherein, in the coding, the audio data is coded by using one coding technique, and the at least one extension data of the audio data is coded by using one or more coding techniques.

12. The method of claim 1, wherein, in the interleaving, at least one group of payloads is dropped based on a transmission environment.

13. At least one computer readable medium comprising computer readable code to control at least one processing element to implement the method of claim 1.

14. An apparatus processing/transmitting a bit-stream, the apparatus comprising:

a coder to code audio data and at least one extension data for the audio data;
an interleaving unit to interleave payloads resulting from the coding by grouping the payloads into a plurality of grouped and interleaved payloads; and
a transmitter to selectively drop at least one group of the plurality of grouped and interleaved payloads, and to transmit a remainder of groups not selectively dropped,
wherein the extension data is at least one selected among data for extending a channel of audio data to a multi-channel, data for extending a bandwidth of audio data, and data for generating a cyclic redundancy code for checking a transmission error of audio data.

15. A method of receiving/processing a bit-stream, the method comprising:
receiving grouped and interleaved payloads;
restoring the grouped and interleaved payloads to original form restored payloads; and
decoding, performed by at least one processing device, audio data included in the restored payloads and at least one extension data for the audio data,
wherein the extension data is at least one selected among data for extending a channel of audio data to a multi-channel, data for extending a bandwidth of audio data, and data for generating a cyclic redundancy code for checking a transmission error of audio data.

16. The method of claim 15, wherein:
in the receiving, select payloads included in a first sub frame and select payloads included in a second sub frame are received as a same group, with alternate payloads having previously been included in the first sub frame and alternate payloads having previously been included in the second sub frame were previously arranged in a separate group during an encoding of the received select grouped and interleaved payloads; and
in the restoring, by de-interleaving payloads received as the same group, the first sub frame is restored, and the second sub frame is restored.

17. The method of claim 16, wherein, in the decoding, audio data included in the restored first sub frame is decoded, and extension data for extending a channel of the audio data included in the second sub frame is decoded.

18. The method of claim 16, wherein, in the decoding, audio data included in the restored first sub frame is decoded, and extension data for extending a bandwidth of the audio data included in the second sub frame is decoded.

19. The method of claim 15, wherein:
in the receiving, a base layer of each layer's payloads of the audio data and a base layer of each layer's payloads of the at least one extension data for extending a channel of the audio data are received as one group; and
in the restoring, by de-interleaving the payloads received as the one group, each layer's payloads of the audio data are restored, and each layer's payloads of the at least one extension data for extending the channel of the audio data are restored.

20. The method of claim 15, wherein:
in the receiving, a top layer of each layer's payloads of the audio data and a top layer of each layer's payloads of the at least one extension data for extending a channel of the audio data are received as one group; and
in the restoring, by de-interleaving the payloads received as the one group, each layer's payloads of the audio data are restored, and each layer's payloads of the at least one extension data for extending the channel of the audio data are restored.

21. The method of claim 15, wherein:
in the receiving, select payloads of the audio data included in a first sub frame and select payloads of the audio data included in a second sub frame are received as one group, and a payload of extension data for extending a bandwidth of the audio data included in the first sub frame and a payload of extension data for extending a bandwidth of the audio data included in the second sub frame are received as one group; and
in the restoring, by de-interleaving payloads received as the one group, each layer's payloads of the audio data are restored, with a payload of the at least one extension data for extending a bandwidth of the audio data.

22. The method of claim 15, the receiving further comprises:
restoring elementary streams by receiving sync layer packets including select grouped and interleaved payloads and parsing the received sync layer packets, wherein, in the restoring, the select payloads are restored to the original form payloads by parsing the restored elementary streams.

23. The method of claim 15, wherein, in the decoding, the audio data is decoded by using one decoding technique, and the at least one extension data is decoded by using at least one decoding technique.

24. The method of claim 15, wherein, in the restoring, the restored payloads are restored based on information regarding the grouped and interleaved payloads provided by a coder and as received with the select grouped and interleaved payloads.

25. At least one computer readable medium comprising computer readable code to control at least one processing element to implement the method of claim 15.

26. An apparatus receiving/processing a bit-stream, the apparatus comprising:
a receiver to receive grouped and interleaved payloads;
a restorer to restore the grouped and interleaved payloads to original form restored payloads; and
a decoder to decode audio data included in the restored payloads and at least one extension data for the audio data,
wherein the extension data is at least one selected among data for extending a channel of audio data to a multi-channel, data for extending a bandwidth of audio data, and data for generating a cyclic redundancy code for checking a transmission error of audio data.

* * * * *

UNITED STATES PATENT AND TRADEMARK OFFICE
CERTIFICATE OF CORRECTION

PATENT NO.       : 8,212,693 B2
APPLICATION NO.  : 11/546435
DATED            : July 3, 2012
INVENTOR(S)      : Junghoe Kim et al.

It is certified that error appears in the above-identified patent and that said Letters Patent is hereby corrected as shown below:

Title Page, Item (60) (Related U.S. Application Data), Line 3, Delete "2006." and insert -- 2005. --, therefor.
Column 1, Line 10, Delete "2006," and insert -- 2005, --, therefor.

Signed and Sealed this
Twentieth Day of November, 2012

David J. Kappos
*Director of the United States Patent and Trademark Office*